UNITED STATES PATENT OFFICE.

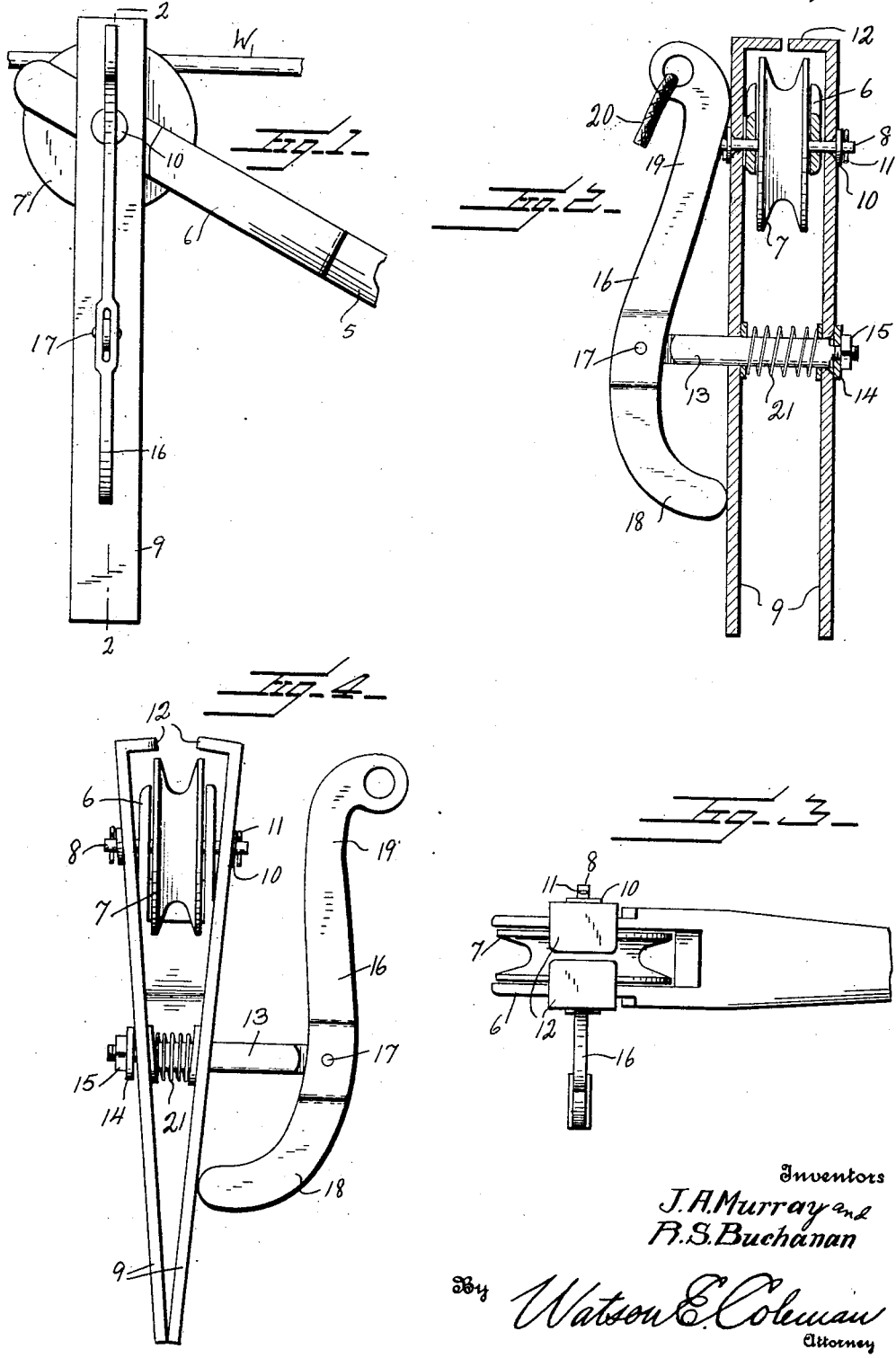

JOHN A. MURRAY AND ROBERT S. BUCHANAN, OF PATTON, PENNSYLVANIA.

TROLLEY-WHEEL GUARD.

1,376,722.

Specification of Letters Patent.

Patented May 3, 1921.

Application filed November 9, 1918. Serial No. 261,883.

*To all whom it may concern:*

Be it known that we, JOHN A. MURRAY and ROBERT S. BUCHANAN, citizens of the United States, residing at Patton, in the county of Cambria and State of Pennsylvania, have invented certain new and useful Improvements in Trolley-Wheel Guards, of which the following is a specification, reference being had to the accompanying drawings.

This invention relates to trolley wheel guards, and has for its primary object to provide simple and effective means for preventing the trolley wheel from jumping off of the wire.

It is another object of the invention to provide a trolley wheel guard embodying relatively movable spring-held guard arms having retaining lugs extending over the wire, and manually operable means for easily and quickly moving said guard arms relative to each other and releasing the trolley wheel from the wire.

It is also a further general object of our invention to provide a device for the above purpose which is simple in its construction, as well as strong and durable, effective and reliable in practical use, and capable of manufacture at relatively small cost.

With the above and other objects in view, the invention consists in the improved construction, combination and relative arrangement of the several parts as will be hereinafter more fully described, subsequently claimed and illustrated in the accompanying drawing in which similar reference characters designate corresponding parts throughout the several views; and wherein:—

Figure 1 is a side elevation illustrating the preferred embodiment of our invention;

Fig. 2 is a section taken on the line 2—2 of Fig. 1;

Fig. 3 is a plan view; and

Fig. 4 is an end elevation showing the guard members in open position.

Referring in detail to the drawing, 5 designates the trolley pole having a harp 6 on one of its ends in which the trolley wheel 7 is mounted upon the bolt or axis 8.

Each of the guard members 9 consists of a metal bar having an opening therein adjacent one of its ends, through which the bolt 8 is engaged. These bars are disposed against the outer sides of the spaced arms of the harp 6 and washers 10 are engaged upon the ends of the bolt 8, suitable cotter pins 11 being inserted through transverse openings formed in the bolt. The bars 9 project above the trolley wheel 7 and are formed upon their ends with the inwardly projecting lugs or fingers 12 to extend over the trolley wire, indicated at W, which is engaged in the peripheral groove or channel of the wheel.

Each of the bars 9 is provided with an elongated opening intermediate of its ends, and these openings receive a rod 13 preferably of oval or elliptical shape in cross section so as to obviate turning or rotative movement of the rod in said bars. A washer 14 and nut 15 are engaged upon one end of the rod 13, while to the other end thereof, a lever 16 is pivotally connected, as at 17. The relatively short, downwardly projecting end portion of this lever is inwardly curved, as at 18, and bears constantly against the outer side of one of the bars 9. The upwardly extending portion of the lever also normally contacts against the bar and at its upper end is curved laterally away from said bar, as at 19, said upper end of the lever having an opening therein for the convenient attachment of a rope or cable 20 to the lever.

A spring 21 is engaged upon the bolt 13 between the bars 9 and normally urges the lower ends of said bars away from each other, thereby urging the upper ends of the bars which are provided with the lugs 12 inwardly toward each other. With the bars 9 in this normal position, it will be apparent that the lugs 12 effectively retain the wheel in engagement upon the trolley wire and prevent accidental jumping of the wheel off of the wire.

When it is desired to lower the trolley pole, the rope or cable 20 is pulled, thereby pulling outwardly and downwardly upon the upper end of the lever 16. The lower end 17 of said lever bearing against the outer side of one bar 9 tends to force said bar inwardly, while the outward pull by the lever upon the rod 13 tends to move the other bar 9 in a relatively opposite direction, or toward the first bar, such movement of the bars being resisted by the spring 21. The upper ends of the bars 9 having the lugs 12 thereon are thus moved outwardly away from each other as the bars are rocked upon the bolt or axis 8 of the trolley wheel so that the trolley wire may move freely between the opposed lugs 12 when the wheel is disengaged from the wire and the trolley pole lowered.

From the foregoing description, taken in connection with the accompanying drawing, the construction, manner of operation and several advantages of our invention will be clearly and fully understood. The several parts of our improved trolley guard are all of simple form, durable in construction, and not liable to get out of order. The device provides very effective and reliable means for at all times holding the trolley wheel in its applied position on the wire and preventing its accidental disengagement therefrom, while at the same time, the wheel may be easily and quickly released when necessary in order to lower the pole.

We have herein shown and described the preferred form, construction and relative arrangement of the several elements employed, but it is to be understood that the same are susceptible of considerable modification and we, accordingly, reserve the privilege of adopting all such legitimate changes as may be fairly embodied within the spirit and scope of the invention as claimed.

We claim:—

A device of the character described comprising a trolley wheel harp, a pair of guard members movably mounted on said harp, the intermediate portion of said members having registering openings, a shaft mounted in said openings, one end of the shaft being operatively connected to one of said members, the intermediate portion of the shaft extending through the opposite member, a spring surrounding said end and intermediate portions of the shaft between said members, a lever having its ends extended in opposite directions and in angular relation to the lever, said lever being pivoted adjacent one of its ends to the opposite end of said shaft in spaced relation to the adjacent guard member, said guard member being constantly urged into engagement with the angularly extended end portions of said lever through the medium of the spring.

In testimony whereof we hereunto affix our signatures in the presence of two witnesses.

JOHN A. MURRAY.
ROBERT S. BUCHANAN.

Witnesses:
C. ROSS LEARY,
JOHN ZEM.